United States Patent Office 2,967,347
Patented Jan. 10, 1961

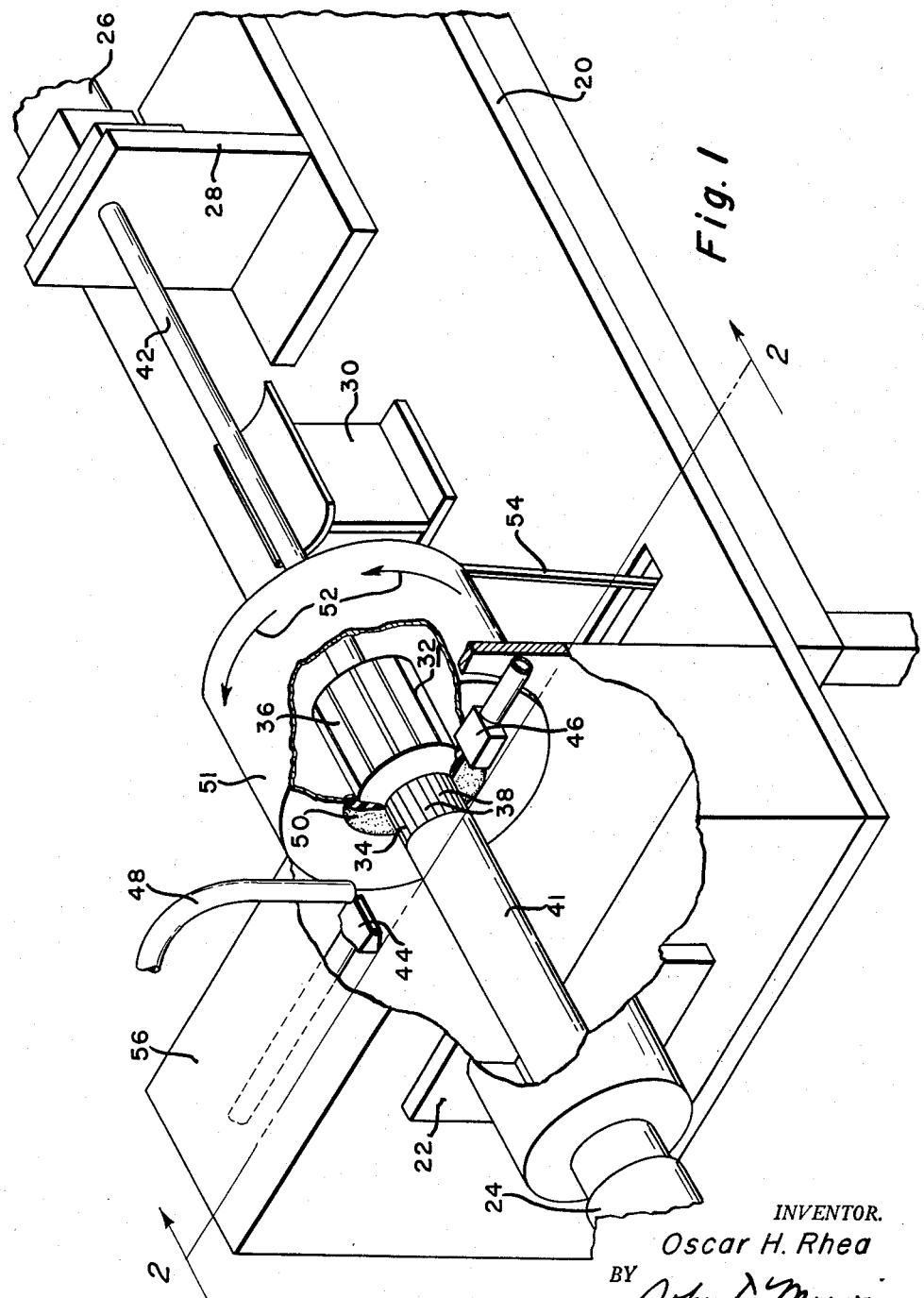

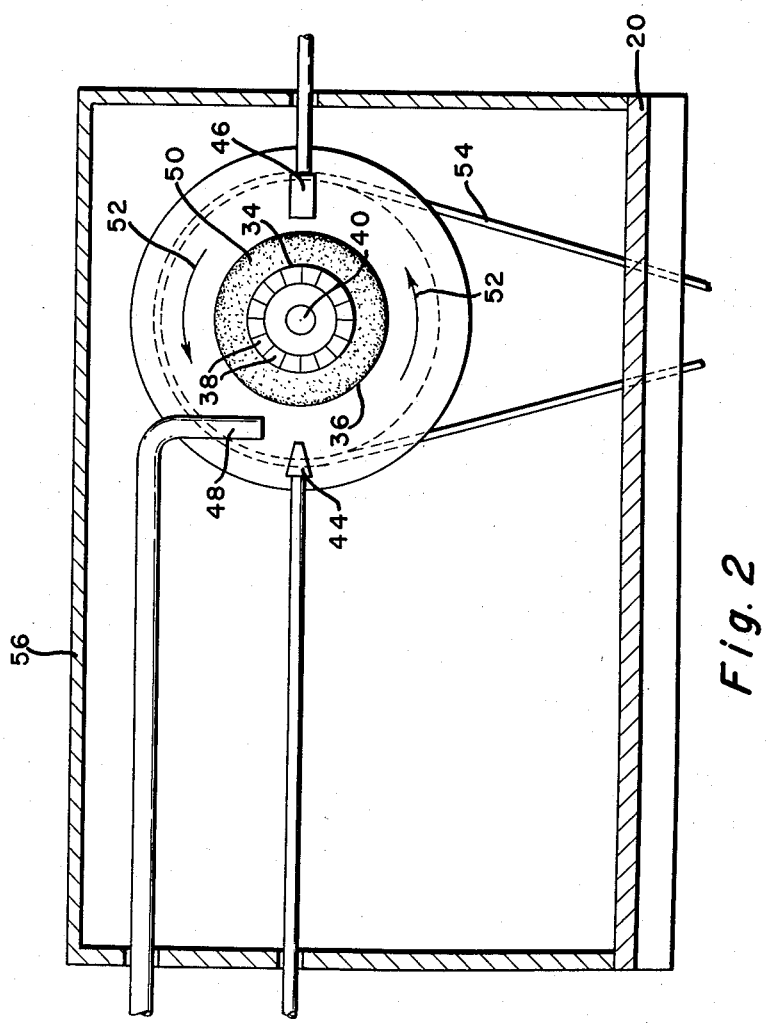

2,967,347
METHOD OF UNDERCUTTING A COMMUTATOR

Oscar H. Rhea, Anderson, Ind., assignor to General Motors Corporation, Detroit, Mich., a corporation of Delaware Filed Nov. 7, 1956, Ser. No. 620,891

3 Claims. (Cl. 29—155.54)

This invention relates to the manufacture of components for dynamoelectric machines and is more particularly concerned with the removal of the insulation between the metal segments of a commutator.

In the present day manufacture of dynamoelectric machines, an assembled commutator and armature core are positioned on a shaft. The armature core is then wound with wire which is arranged to form individual coil windings. The ends of these wire coils are then secured to the commutator segments to complete the armature assembly. After the assembly is completed, the commutator is machined so the outer surface of the commutator will have a predetermined outer diameter and finish. After the commutator is machined, a portion of the insulation between the individual commutator segments is removed by sawing the insulation to a predetermined depth. After the sawing operation has been completed, the outer surface of the commutator is lightly sanded to restore the original finish and to remove any burrs which may be formed during the sawing operation.

In the method according to the present invention, the insulation between the copper metal commutator segments is removed by means of an abrasive which is carried in a fluid that is projected under pressure against the commutator while the commutator is rotated. When this method is employed, the abrasive in the fluid will differentially cut the insulating material and remove the same from between the segments without appreciable damage to the copper material which forms the segments or the windings of the armature which are connected to the segments.

It is, therefore, an object of the present invention to remove the insulation from between the segments of a commutator by a fluid carried abrasive.

It is a further object of the present invention to remove the insulation from between the segments of a commutator by a fluid carried abrasive after the commutator has been machined to a predetermined outer diameter.

Another object of the present invention is to remove a portion of the insulation from between the segments of a commutator after the ends of the coil winding of the armature have been connected to the segments of the commutator and after the commutator has been machined to size by a fluid carried abrasive without injury to the metal segments of the commutator or to the insulation on the wires of the armature windings.

Further objects and advantages of the present invention will be apparent from the following description, reference being had to the accompanying drawings wherein a preferred embodiment of the present invention is clearly shown.

In the drawings:

Fig. 1 diagrammatically shows, in perspective, an apparatus for practicing the method according to the present invention.

Fig. 2 is a cross-sectional view taken along line 2—2 in Fig. 1.

In the drawings, the numeral 20 designates a base which will support the apparatus which is used to practice a method according to the present invention. Positioned on one end of the base is a support 22 to which a fluid cylinder 24 is secured. The cylinder 24 will be hereinafter referred to as the unloading cylinder and preferably will be actuated in synchronism with the loading cylinder 26 carried by a support 28 that is secured to the other end of base 20. Positioned intermediate the supports 22 and 28 is a loading platform 30 which has its top portion curved as shown so that an armature assembly 32 may be positioned thereon. The armature assembly 32 includes a commutator 34 and a core 36 which preferably has wire coils wound thereon in the well known manner. The ends of the wire coils are secured to the individual segments 38 of the commutator in the conventional manner. The individual segments 38 of the commutator 34 are insulated from one another by mica or any other suitable well known insulating material. The present invention is directed to the removal or undercutting of this insulating material after the commutator has been initially machined to the proper diameter. The armature assembly 32 is initially placed on the loading platform 30 and the shaft 40 of the armature assembly 32, shown in Fig. 2, is chucked between rods 41 and 42 movable by cylinders 24 and 26. The cylinders 24 and 26 are then actuated to move the armature assembly from the loading platform to the position shown in Fig. 1 where the commutator will be in alignment with the nozzles 44, 46 and 48, while the wire windings of the core 32 will be pressed against the large O-ring 50. The armature will also be held in a suitable driving means 51, which is arranged to be supported on support 20 in some suitable manner to be rotated in the direction of the arrows 52 by means of the belt 54 that is driven by an electric motor, not shown. The nozzle 44 is used to direct high pressure steam against the commutator. I have found that when steam having a pressure in the order of 150 pounds per square inch is directed against the commutator 34, it will cause the grit in an abrasive slurry which is conducted through nozzle 48 to be projected against the commutator 34 with a sufficient force to remove the insulating material from between the copper commutator segments 38 without appreciable damage to the metal of the segments. A grit which I have found to be highly effective for this purpose may range from 200 to 400 mesh aluminum oxide which is mixed in water in the ratio of 40% oxide to 60% water to form the slurry. It is clear from the drawings that as the abrasive grit contained in the slurry is projected against the commutator 34, the armature 32 is rotated so that an even cut of the insulation from between the segments will be achieved. After the cutting operation has been completed, the grit, which may remain on the commutator, is removed by means of a jet of steam or air which is delivered through nozzle 46. During the cutting operation, the grit in steam is confined in the hood which is broadly designated by numeral 56, which is also carried by support 20. After the insulating material has been removed from between the segments 38, the fluid cylinders 24 and 26, which may be either air or hydraulic, may be actuated to move the armature assembly 32 to the right to the loading platform 30.

In the embodiment shown in Fig. 1, the nozzles 44 and 46 are stationary and are sized and shaped so that the abrasive grit is directed over the entire surface of the commutator to accomplish the cutting operation. Obviously, these nozzles may be oscillated, if desired, while the commutator is rotated to accomplish the same result. I have further found that the O-ring 50 which acts as a baffle, preferably made of rubber or other suitable elastomeric materials, will prevent grit and water from entering the armature windings. If the O-ring is not used, this grit and water may cause shorts after the armature assembly is placed in service. I have further found that if the nozzles 44 and 48 are properly shaped, the insulation will be removed from between the commutator segments without damage to the insulation of the wire ends which are connected to the segments.

Another feature which has not been heretofore noted is that when the insulation is removed from between the individual segments 38 of the commutator, a very slight cutting of the metal will occur. This slight cutting of the metal will be noticed as a slight rounding of the edges of the commutator segments 38. These rounded edges are highly desirable in the commutator as they will reduce brush noise after the commutator is placed in service. It has also been observed that the surface of the commutator 34, which was initially machined, will be slightly abraded to have a dull or frosted appearance. This slightly abraded surface will aid in the initial seating of the brushes, provide a better commutation of the armature and increase the life of the brushes when the brushes ride on the commutator segments.

While the embodiment of the present invention as herein disclosed constitutes a preferred form, it is to be understood that other forms might be adopted.

What is claimed is as follows:

1. In a method for undercutting commutator insulation in a finished commutator having an operating surface consisting of alternating metallic bars separated from each other by insulating bars which are more easily abradable than the metal, the steps comprising; machining the commutator so an outer uniform cylindrical surface is formed providing a nozzle for emitting a jet of pressurized fluid carrying abrasive particles therein, positioning the machined cylindrical surface commutator in the path of said emitted fluid, causing continuous relative rotation between the jet and the commutator whereby the commutator surface is subjected uniformly and continuously to the action of said abrasive, and simultaneously differentially abrading the commutator for a time sufficient to undercut the insulation portions below the metallic bars.

2. In a method for undercutting a commutator having an operating surface consisting of a plurality of radially spaced metal bars each separated by a segment of insulating material which is more easily abradable than the metal, the steps comprising; machining the commutator so an outer uniform cylindrical surface is formed rotating the commutator, directing a stream of fluid containing abrasive particles onto the machined cylindrical surface of said rotating commutator, differentially abrading the surface of said commutator whereby the insulation segments are abraded away at a faster rate than the metal, and continuing said abrasing until the desired degree of undercut is obtained.

3. In a method for undercutting a commutator having an operating surface consisting of a plurality of radially spaced metal bars each separated by a segment of insulating material which is more easily abradable than the metal wherein said commutator is carried by a shaft which also carries an armature having coil windings thereon wherein the ends of the coil windings are predeterminately attached to the metal segments for forming an armature assembly, the steps comprising; machining the commutator so an outer uniform cylindrical surface is formed placing the machined armature in a fixture and shielding the coil ends, continuously rotating the armature assembly in said fixture, concomitantly abrading differentially the metal and insulation segments on the machined cylindrical surface of the commutator without affecting the shielded coil ends for a time sufficient to undercut the insulation segments and to round off the edges of the metal segments adjacent thereto, and finally removing the armature with its undercut commutator from the fixture.

References Cited in the file of this patent
UNITED STATES PATENTS

| | | |
|---|---|---|
| 446,962 | Bryce | Feb. 24, 1891 |
| 1,303,011 | Aurand | May 6, 1919 |
| 1,413,060 | Roberts | Apr. 18, 1922 |
| 1,994,062 | Bonanno | Mar. 12, 1935 |
| 2,269,219 | Miller | Jan. 6, 1942 |
| 2,712,172 | Bayha | July 5, 1955 |
| 2,743,554 | Dailey et al. | May 1, 1956 |